United States Patent
Peters et al.

(10) Patent No.: US 12,410,940 B2
(45) Date of Patent: Sep. 9, 2025

(54) SELF-ADHERING DUCT INSULATION PRODUCT

(71) Applicant: JOHNS MANVILLE, Denver, CO (US)

(72) Inventors: Riley Peters, Denver, CO (US); Nicholas O'Kane, Centennial, CO (US); Ames Kulprathipanja, Broomfield, CO (US); Jerry Kenneth Powell, Weatherford, TX (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/854,079

(22) Filed: Jun. 30, 2022

(65) Prior Publication Data

US 2024/0003589 A1    Jan. 4, 2024

(51) Int. Cl.
*F24F 13/02* (2006.01)
*F16L 59/02* (2006.01)
*F16L 59/147* (2006.01)

(52) U.S. Cl.
CPC ........ *F24F 13/0263* (2013.01); *F16L 59/026* (2013.01); *F16L 59/028* (2013.01); *F16L 59/147* (2013.01)

(58) Field of Classification Search
CPC ... F24F 13/0263; F16L 59/026; F16L 59/028; F16L 59/147
USPC .......................................... 138/110, 149, 170
See application file for complete search history.

(56) References Cited

U.S. PATENT DOCUMENTS

| | | | | |
|---|---|---|---|---|
| 4,606,957 A | * | 8/1986 | Cohen ...................... | B32B 7/06 428/40.9 |
| 4,780,347 A | * | 10/1988 | Cohen ..................... | B32B 5/024 138/155 |
| 5,123,453 A | * | 6/1992 | Robbins ................ | F16L 59/023 138/167 |
| 5,690,147 A | * | 11/1997 | Cridland ................. | F16L 59/10 138/147 |
| 5,783,268 A | * | 7/1998 | Noonan .............. | F24F 13/0263 428/36.1 |
| 7,749,923 B2 | * | 7/2010 | Moore .................... | B32B 15/04 442/52 |
| 2006/0054235 A1 | * | 3/2006 | Cohen ..................... | B32B 5/022 138/149 |
| 2007/0017590 A1 | * | 1/2007 | Tigerfeldt ........... | F24F 13/0263 138/149 |
| 2009/0120523 A1 | * | 5/2009 | Bright .................... | F16L 59/022 156/305 |
| 2017/0108158 A1 | * | 4/2017 | Shumate ................. | B32B 37/14 |

FOREIGN PATENT DOCUMENTS

WO    WO 99/13185    * 3/1999

* cited by examiner

*Primary Examiner* — David R Deal
(74) *Attorney, Agent, or Firm* — Robert D. Touslee

(57) ABSTRACT

A duct insulation product may include an insulation material and a moisture barrier material coupled with the insulation material. The moisture barrier material may form an outer surface of the duct insulation product. The moisture barrier material may include at least one closure flap along at least one side of the moisture barrier material. The closure flap may extend beyond a periphery of the insulation material along at least one side of the insulation material. At least a portion of an inner surface of the closure flap may include an adhesive material.

20 Claims, 4 Drawing Sheets

SELF-ADHERING DUCT INSULATION PRODUCT

BACKGROUND OF THE INVENTION

Ductwork, or ducting, is often used to transport one or more fluids between destinations. For example, ductwork may be used to transport air from heating, ventilation and air-conditioning (HVAC) equipment throughout a building. The ductwork is made from a metal material, such as stainless steel, galvanized steel, carbon steel (black iron), aluminum, titanium, etc., or from a plastic material, such as polyvinyl chloride (PVC), chlorinated polyvinyl chloride (CPVC), fiber reinforced plastic (FRP), polypropylene (PP), polyethylene (PE), ceramic, fiberglass, or concrete material, etc.

During fluid transportation, the fluid may be subjected to heating and/or cooling from the surrounding environment. For example, the fluid may be transported in either a hot or cold state relative to the surrounding environment, which induces heat transfer to or from the fluid and ducts. HVAC systems are a common example of systems that routinely utilize various duct configurations to transport hot or cold fluids. Due to the conductive nature of the ducts (especially metal ducts), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

To reduce heat transfer during fluid transportation, duct insulation products are commonly installed on one or more sections of the ductwork to retard the flow of heat to or from the ducts. Commonly, one or more sections of duct are fitted with a duct insulation product where the sections of duct are generally fully encased within the duct insulation product. Separate sections of the duct insulation product are often coupled together via adhesive tapes. The outer surface of the duct insulation product is often designed to enhance the visual appeal of the ductwork and serve as a means for sealing the duct insulation product about the ducts of the ductwork. In addition, the various materials of the duct insulation product often serve one or more important functions (e.g., restricting water vapor transmission; resisting mold, mild, and/or fungal growth; providing puncture resistance, tensile strength, and/or durability; resisting UV, handling, environmental, and/or shipping damage, etc.).

To perform some of these functions, it is critical that the outer material of the duct insulation product be sealed and remain sealed over the life of the duct insulation product. For example, the duct insulation product may include one or more materials that restrict the transmission of water vapor or other environmental contaminants through the laminate. Generally, a duct insulation product is required to have a water vapor transmission rate of no greater than 0.02 perms. If the duct insulation product is not able to seal and/or remain sealed over the life of the product, the material that functions as a water vapor barrier or retarder may be compromised or circumvented because water vapor and/or other contaminants may freely flow through the unsealed portion of the duct insulation product.

Leakage of water vapor and/or other contaminants into the duct insulation product's interior may cause a variety of problems for the insulated duct and/or surrounding objects including: condensation of water on the ducts; mold, mildew, or fungal growth; duct corrosion or degradation; staining of the duct insulation product and/or surrounding objects; water drip damage; loss of the duct insulation product's insulating value, etc. Hence, the integrity of the duct insulation product's seal is critically important to the functionality of the duct insulation product.

BRIEF SUMMARY OF THE INVENTION

The present technology relates to insulation products, such as duct, pipe, or other insulation products. In some embodiments, the insulation product, such as a duct insulation product, may include an insulation material and a moisture barrier material coupled with the insulation material. The moisture barrier material may form an outer surface of the duct insulation product. The moisture barrier material may include at least one closure flap along at least one side of the moisture barrier material. The closure flap may extend beyond a periphery of the insulation material along at least one side of the insulation material. At least a portion of an inner surface of the closure flap may include an adhesive material.

In some embodiments, the duct insulation product may be flexible. The insulation material may be or include fiberglass. The moisture barrier material may be or include a foil scrim kraft paper laminate, fiberglass reinforced faces, a poly facing, polyisocyanurate, an all service jacketing facing. The adhesive material may be characterized by a thickness of greater than or about 0.01 mm. The adhesive material may be characterized by a peel strength of greater than or about 60 ounces per inch. The adhesive material may be disposed along substantially an entire length of the moisture barrier material. The adhesive material may be or include double-sided tape. The duct insulation product may be rolled up prior to installation. The adhesive material may be applied to the closure flap prior to rolling up the insulation material.

Some embodiments of the present technology may directed to duct insulation systems. The systems may include a plurality of duct insulation products. Each duct insulation product may include an insulation material and a moisture barrier material coupled with the insulation material. The moisture barrier material may extend beyond a periphery of the insulation material along at least one side of the insulation material to form a closure flap. At least a portion of an inner surface of the closure flap may include an adhesive material. The adhesive material of the closure flap of a first duct insulation product may couple with and secure a second duct insulation product.

In some embodiments, the duct insulation system may be positioned around one or more ducts. The adhesive material may be characterized by a thickness of greater than or about 0.01 mm. The adhesive material may be characterized by a width of less than or about 8.0 inches. The moisture barrier material may include a length at least double a width of the moisture barrier material. The adhesive material may be disposed along substantially an entire length of the moisture barrier material. A first end of each duct insulation product may be defined by a male shiplap profile. A second end of each duct insulation product may be defined by a female shiplap profile. The closure flap and the adhesive material may be defined on at least one inner surface of the second end.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

The ensuing description provides exemplary embodiments only, and is not intended to limit the scope, applicability, or configuration of the disclosure. Rather, the description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the present invention are directed to insulation products such as duct insulation products. The duct insulation products may include an insulation material and a moisture barrier material. At least a portion of the moisture barrier material may extend beyond a periphery of the insulation material along at least one side of the insulation material, thereby forming a closure flap. An adhesive material on an inner surface of the closure flap may be used to seal the moisture barrier to a lateral edge portion of the moisture barrier material of the same duct insulation product or of a second duct insulation product. The closure flap and adhesive material may eliminate the need for stapling the moisture barrier material and applying an adhesive or tape over the stapled portion as done in conventional installations. Thus, the closure flap and adhesive material may reduce installation time and may even improve the sealing properties of the insulation material, as no punctures in the moisture barrier material are necessary. While discussed primarily in the context of duct insulation, it will be appreciated that the features described herein may be applied to other insulation applications, including piping, tubing, and the like. Additionally, while generally discussed in terms of duct wraps, it will be appreciated that the insulation products described herein may be utilized as duct liners, duct boards, pipe insulation, insulation batts, and/or other types of insulation products.

Figure 1:
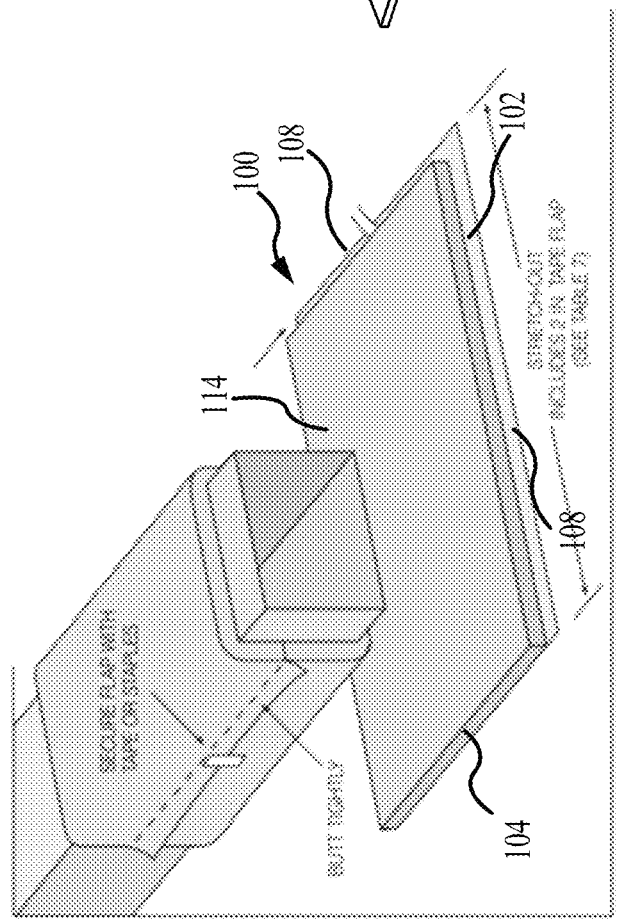
FIG. 1 illustrates is a schematic perspective view of a duct insulation product according to embodiments of the present invention.

Referring now to FIG. 1, a duct insulation product 100 may include an insulation material 104 that may include an outer surface (i.e., the outside of the core that directly contacts the laminate) and an inner surface 114. While shown as having a generally rectangular shape, it will be appreciated that the insulation product 100 may have other shapes to fit about ducts, pipes, and/or other structures having non-circular cross-sections. For example, the insulation product 100 may be affixed about an exterior surface of a structure having a generally circular cross-section in some embodiments. The insulation product 100 may include a layer of insulation material 104, an inner surface of which may form the inner surface 114 of the insulation product 100. The insulation material 104 may provide thermal and/or acoustic insulating properties to the duct insulation product 100. In one embodiment, the insulation material 104 may be a fibrous material (e.g., fiberglass, mineral wool, refractory ceramic fiber, chopped strand fiber glass, etc.). In other embodiments the insulation material 104 may be a foam (e.g., phenolic foam, polyisocyanurate, polyolefin, polystyrene, polyurethane), a polymer, foam glass, microporous insulation, or any other material that provides insulation.

The inner surface 114 may be configured to correspond with a specific duct outer profile (e.g., rectangular ducting having sizes from about 3 inches by about 7 inches up to about 35 inches by about 40 inches or round ducting with a diameter between about 4 inches and about 41 inches, etc.). In other embodiments, the duct insulation product 100 may be a trim-to-fit product that may be cut to a desired size during installation, and may enable the insulation product 100 to be used to insulate ducts and/or other structures of different sizes and/or shapes. For example, the insulation product 100 may have at least one dimension (e.g., length and/or width) that is larger than a duct (or other structure to be insulated) such that the insulation product 100 may be trimmed, onsite to fit about the structure. In embodiments, the insulation product 100 may include a number of generally planar segments that are separable and/or pivotal relative to one another, and may include opposing ends that may be overlapped and/or joined such that the insulation product 100 may be secured about a structure that includes a non-circular cross-section.

Surrounding and encasing the insulation material 104 may be a laminate jacket or simply a laminate 102. The laminate 102 may have a thickness that includes one or more layers of various materials as described below. The laminate 102 may be roughly co-extensive with the insulation material 104 and bonded to the outer surface of the insulation material 104. The laminate 102 may be positioned so that an edge portion extends parallel and adjacent to the insulation material 104. A peripheral edge of the laminate 102 may extend beyond a peripheral edge of the insulation material 104 to form at least one closure flap or end 108 that extends along all or a portion of a length of one or more edges of the insulation product 100. Each closure end 108 may be secured the laminate 102 to itself in a closed position fully encasing the insulation material 104 within the laminate 102 (or within multiple laminates that are joined together). For example, the closure end may be fixed to the laminate 102 of another insulation product 100 or to the laminate 102 itself. As will be further described below, the closure end 108 may include an adhesive material on an inner surface of the laminate 102 that adheres to the laminate 102 of another insulation product 100 or to the laminate 102 itself.

Maintaining a sealed closed position may be a desirable function of the closure end 108 so that the insulated pipe and/or insulation material are not subjected to one or more environmental elements, such as water vapor. If the closure end 108 is not able to seal or remain sealed (e.g., the closure end 108 curls backward and/or at least partially disengages from the surface on which the closure end 108 is adhered) after being adhered to the laminate's (or another laminate's) outer surface, then water vapor and/or other contaminants may pass between the closure end 108 and thereby leak or pass into the interior of the duct insulation product (i.e., pass to the encased duct (or other structure) and insulation material). Water vapor and/or other contaminants that pass into the laminate's interior may cause condense on the ducts; causing corrosion or degradation; mold, mildew, and/or fungal growth; water drip damage; staining of the laminate and/or surrounding objects; loss of the duct insulation product's insulating value; etc. The laminate 102 may include one or more flame retardants, fungi growth inhibiting agents, charge dissipators, and/or other additives to enhance the performance of the laminate.

Figure 2:
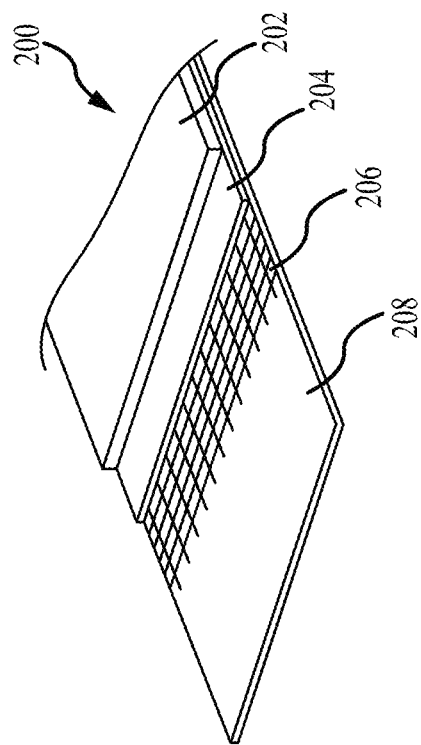
FIG. 2 illustrates a partial schematic perspective view of a duct insulation product according to embodiments of the present invention.

FIG. 2 depicts a laminate 200 according to one embodiment of the present invention. FIG. 2 shows portions of the laminate 200 broken away to reveal the various layers of the laminate 200. The laminate 200 may include an outer layer composed of a foil or metallized polymeric film sheet 208. The polymeric film sheet 208 may be selected as the laminate's 200 outer layer to provide one or more of the following advantages:

shielding porous media sheet 204 and/or insulation material 202 from water vapor absorption; protecting against UV damage; protecting against mold, mildew, or fungal growth; providing a smooth, unwrinkled, visually appealing outer surface; etc. Polymeric film materials may generally provide a smoother, more visually appealing outer surface when compared with traditional laminates.

In embodiments, sheet 208 may include a layer that is made of aluminum foil or metallized polyethylene terphthalate (MPET) between about 0.48 mm and about 100.0 mm in thickness (i.e., between about 48 and 100 gauge in thickness). The aluminum foil or MPET may provide a nearly impermeable fluid vapor barrier to fluids that are external to and surrounding the pipe insulation product. By using the foil or metallized polymeric film sheet 208, fluid may be passed through the insulated duct, and one or more environmental elements (e.g., water vapor) in the surrounding environment may be restricted (or kept) from penetrating through laminate to the duct. For example, the foil or metallized polymeric film sheet 208 may be nearly impermeable to water vapor, which protects the insulated duct from corrosion, loss of insulating value, mold growth, etc. The foil or metallized polymeric film sheet 208 may enable the laminate 200 to provide a water vapor transmission rate of less than 0.02 perms. If the closure end 108 becomes unsealed, however, the water vapor barrier may be circumvented as water vapor may freely flow between the unsealed portion of the laminate.

The laminate 200 may also include a scrim 206 that may include a mesh of a plurality of fibers. The scrim 206 may function to reinforce and strengthen the laminate 200 and thereby provide increased tensile strength, puncture resistance, etc. The scrim 206 may be made of fiberglass reinforcing yarn, such as but not limited to a G75 or H110 yarn. In addition, the yarn may be configured to be from 2 to 6 strands per inch in both the machine and cross machine directions, with a typical scrim being about 5 strands per inch in both directions. In some embodiments the scrim 206 may be made of polyester strings or any other synthetic string. The scrim 206 may be positioned immediately adjacent to the foil or metallized polymeric film sheet 208 or may positioned anywhere else within the laminate (i.e., may be positioned immediately adjacent the polymeric film sheet 202).

The laminate 200 may also include a porous media sheet 204. The porous media sheet 204 may be positioned immediately adjacent to the scrim 206 or may be positioned anywhere else within the laminate 200. The porous media sheet 204 may be a kraft paper that is between about 25 and 45 pounds/3000 square feet and may include one or more additives to enhance the performance of the laminate 200 (e.g., fire retardant additives and/or anti-microbial agents to prevent mold or fungal growth and prevent propagation of smoke and/or fire). In one embodiment, the porous media sheet 204 may be a kraft paper between 25 and 35 pounds/3000 square feet to provide increased seal integrity and/or closure of the closure end 108 without significantly degrading beneficial properties of the laminate (e.g., tensile strength, puncture resistance, handling damage resistance, etc.). In one specific embodiment, the kraft paper may be roughly 30 pounds/3000 square feet to provide optimal levels of closure end seal integrity and laminate properties.

Alternatively, the porous media sheet 204 may be other materials such as a fiberglass mat, synthetic mat, paper, etc. Likewise, in some embodiments the scrim 206 and porous media sheet 204 may be replaced by a single, preferably porous, material. The porous nature of the porous media sheet 204 may allow absorption and retention of one or more additives within the porous media sheet layer, which may provide one or more enhancements to the laminate 200 (e.g., flame and smoke propagation resistance; mold, mildew, and/or fungal growth resistance; etc.).

In laminates that employ a kraft paper, the use of a heavy weight kraft paper (e.g., 40-45 pounds/3000 square feet) may be preferred because such papers provide several advantages over lighter weight papers (e.g., 25-35 pounds/3000 square feet). For example, heavier weight kraft papers may provide structural advantages including increased durability, support, tensile strength, puncture resistance, handling damage resistance, environmental damage resistance, shipping damage resistance, etc. and/or may provide aesthetic advantages including a smoother, visually appealing, and more abuse resistant the outer surface. Heavy weight kraft papers, however, may increase that stiffness and rigidity of the laminate, which may increase a laminate's closure end seal failure due to the laminate's resistance to bending or curling towards the closed position and remaining in the closed position (i.e., stiff and rigid laminates may be biased toward a flat or unsealed position).

The use of a lighter weight kraft paper (e.g., 25-35 pounds/3000 square feet) may increase a laminate's closure end seal integrity by decreasing the laminate's resistance to bending or curling toward the closed position. In addition, the lighter weight kraft paper may not significantly degrade the beneficial properties of the laminate so that the laminate's functionality is not comprised. A paper weight that is roughly 30 pounds/3000 square feet may provide an optimal level of seal integrity vs. laminate properties. The present invention, however, is not limited to the use of a lighter weight kraft paper (or to the use of a kraft paper in general).

The laminate 200 additionally may include an insulation material 202. The insulation material 202 may be a fibrous material (e.g., fiberglass, mineral wool, refractory ceramic fiber, chopped strand fiber glass, etc.) or a foam (e.g., phenolic foam, polyisocyanurate, polyolefin, polystyrene, polyurethane), a polymer, foam glass, microporous insulation, or any other material that provides insulative properties. When cold fluid is passed through the duct, the insulation material 202 may prevent water vapor from condensing on the pipes and causing the associated problems described herein. Again, if the closure end 108 becomes unsealed, however, the water vapor barrier may be circumvented as water vapor may freely flow between the unsealed portion of the laminate.

The foil or metallized polymeric film sheet 208, the scrim 206, the porous media sheet 204, and the insulation material 202 may be bonded or adhered together using one or more adhesives (not shown). The adhesive or adhesives used may be contact type, pressure sensitive, heat seal, etc. and may include one or more additives to enhance the performance, dimensional stability, moisture resistance, handleability, fire and smoke propagation resistance, and/or durability of the laminate 200. Examples of adhesives that can be used include, but are not limited to, melamine, urea formaldehyde, phenolic, polyurethane, acrylic, latex, and acrylonitrile. Additional adhesives that can be used may include adhesives that can migrate into the porous media sheet 204 to improve the physical characteristics of the laminate 200 (e.g., improve UV stability, flame spread resistance, mold growth resistance, etc.). Examples of such migrating adhesives include colloidal silica or alumina, sodium or potassium silicate, ammonium phosphate stabilized with zinc oxide, magnesia or alumina; borax, and oxi-chloride stabilized with zinc oxide or magnesia.

Figure 3:
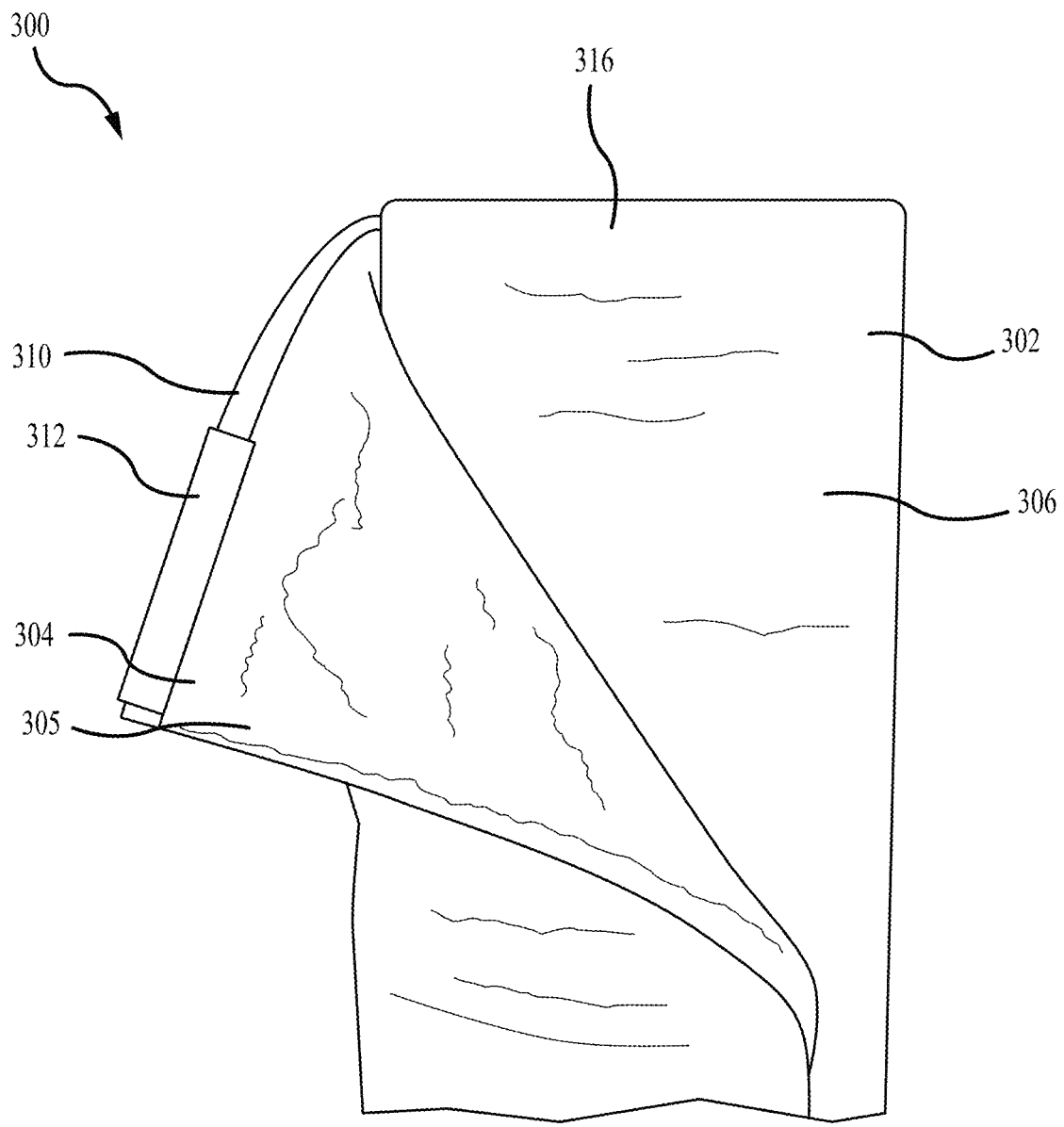
FIG. 3 illustrates a side elevation view of duct insulation product with a closure flap according to embodiments of the present invention.

FIG. 3 shows a duct insulation product 300 with a closure flap 310 according to embodiments of the present invention. While referred to as a duct insulation product, it is contemplated that the product may be positioned around or within various different paths and/or other structures including, but not limited to, ducts, pipes, tubes, channels, passages, etc. While shown as having a generally circular shape, it will be appreciated that the insulation product 100 may have other shapes to fit about ducts, pipes, and/or other structures having non-circular cross-sections. Duct insulation product 300 may be similar to duct insulation product 100 and may include features or characteristics of any of the duct insulation product 100 illustrated and described previously. For example, the duct insulation product 300 may include an insulation material 304. Insulation material 304 may be the same or similar to insulation material 104. The duct insulation product 300 may include a moisture barrier material 302. Moisture barrier material 302 may be the same or similar to laminate 102.

The moisture barrier material 302 may be coupled with the insulation material 304. The insulation material 304 may form an inner surface 305 of the duct insulation product 300. The moisture barrier material 302 may form an outer surface 306 of the duct insulation product 300. The moisture barrier material 302 and the insulation material 304 of the duct insulation product 300 may include a length that is at least double a width of the moisture barrier material 302 and the insulation material 304, respectively. In embodiments, the length of the material may be at least triple, quadruple, five times, ten times, fifteen times, twenty times, or greater than the width of the material. The width of the material may be greater than or about 48 inches, greater than or about 60 inches, or greater than or about 72 inches, or more.

The moisture barrier material 302 may include at least one closure flap 310 along at least one side of the moisture barrier material 302. The closure flap 310 may extend beyond a periphery of the insulation material 304 along at least one side of the insulation material 304. Specifically, the closure flap 310 may be formed by a portion of the moisture barrier material 302 extending beyond the insulation material 304. The closure flap 310 may extend along an entire length of the at least one side of the insulation material 304. In embodiments, the moisture barrier material 302 may extend beyond the insulation material 304 along two or more edges to form two or more closure flaps 310. For example, the moisture barrier material 302 may extend beyond the insulation material 304 along parallel edges. Alternatively, the moisture barrier material 302 may extend beyond the insulation material 304 along perpendicular or adjacent edges. It is also contemplated that the moisture barrier material 302 may extend beyond the insulation material 304 along three sides or four sides. If the closure flap 310 does not extend beyond a periphery of the insulation material 304, the duct insulation product 300 may not provide as strong a seal as if the closure flap 310 does extend beyond a periphery of the insulation material 304. As will be discussed below, an adhesive material 312 on the closure flap 310 may not adhere as well to the insulation material 304, but may adhere better to the moisture barrier material 302.

As previously discussed with regard to FIG. 1, the insulation material 304 may be or include fiberglass, mineral wool, refractory ceramic fiber, chopped strand fiber glass, phenolic foam, polyisocyanurate, polyolefin, polystyrene, polyurethane, a polymer, foam glass, microporous insulation, or any other material that provides insulation. Thus, in embodiments, the duct insulation product 300 may be flexible depending on the material(s) included in the insulation material 304. In other embodiments, the duct insulation product 300 may be rigid. Depending on the application, a flexible material may be employed instead of a rigid material. For example, a flexible material may be desirable for a round duct and a rigid material may be desirable for a rectangular duct.

As also previously discussed with regard to FIG. 2, the moisture barrier material 302 may include a plurality of layers. For example, the moisture barrier material 302 may include an outer layer composed of a foil or metallized polymeric film sheet (e.g., a foil), a scrim that may include a mesh of a plurality of fibers, and a porous media sheet (e.g., a kraft). In embodiments, the moisture barrier material 302 may be or include a foil scrim paper kraft laminate, a fiberglass reinforced facing, a poly facing (e.g., polyisocyanurate), an all service jacket (ASJ) facing, etc.

At least a portion of an inner surface 305 of the closure flap 310 may include an adhesive material 312. The adhesive material 312 may be any glue, cement, mucilage, or paste. In embodiments, the adhesive material 312 may be or include double-sided tape, plant resin (e.g., Mastic), hook and loop fastener (e.g., Velcro®), etc. The adhesive material 312 may be able to bond the closure flap 310 to a lateral edge portion 316 of the moisture barrier material 302. The lateral edge portion 316 may extend parallel and adjacent to the adhesive material 312. The adhesive material 312 may be disposed along substantially an entire length of the at least one closure flap 310. However, it is also contemplated that the adhesive material 312 may be disposed intermittently or discontinuously along the length of the at least one closure flap 310.

As further discussed below, it is contemplated that a plurality of duct insulation products 300 may be assembled together to insulate a length of ductwork. In such embodiments, the adhesive material 312 may bond the closure flap 310 of a first duct insulation product to a lateral edge portion 316 of the moisture barrier material 302 of a second duct insulation product such that two duct insulation products are bonded and sealed together. In embodiments, an additional adhesive (not shown) may be disposed on the lateral edge portion 316 to increase the strength of the bond between the closure flap 310 and the lateral edge portion 316.

The size of the adhesive material 312 may be dependent on the insulation application. In embodiments, the adhesive material 312 may be characterized by a thickness of greater than or about 0.01 mm, such as greater than or about 0.1 mm, greater than or about 0.5 mm, greater than or about 1.0 mm, greater than or about 2.5 mm, greater than or about 5.0 mm, greater than or about 10.0 mm, greater than or about 25.0 mm, greater than or about 50.0 mm, greater than or about 75.0 mm, greater than or about 100.0 mm, greater than or about 150.0 mm, greater than or about 200.0 mm, or more.

The adhesive material 312 may be characterized by a width of less than or about 8.0 inches. For example, the adhesive material 312 may be characterized by a width of less than or about 7.5 inches, less than or about 7.0 inches, less than or about 6.5 inches, less than or about 6.0 inches, less than or about 5.5 inches, less than or about 5.0 inches, less than or about 4.5 inches, less than or about 4.0 inches, less than or about 3.5 inches, less than or about 3.0 inches, less than or about 2.5 inches, less than or about 2.0 inches, less than or about 1.5 inches, less than or about 1.0 inches, less than or about 0.5 inches. In embodiments, the adhesive material 312 may be characterized by a width of between about 0.5 inches and about 8.0 inches. The adhesive material 312 may be characterized by a peel strength of greater than or about ounces per inch.

A release liner (not shown) may be disposed over to the adhesive material 312. The release liner may be removably adhered to the adhesive material 312 on the closure flap 310 to protect the adhesive material 312 prior to installation (e.g., from degradation and from sticking to undesired surfaces prior to installation). In embodiments, the release liner may be paper-based or poly-based. In embodiments, the release liner may be silicon treated.

In embodiments, the closure flap 310 may be further secured in addition to the adhesive material 312. For example, a second adhesive material (such as a tape) may be applied to the outer surface of the duct insulation product 300, such as over the moisture barrier material 302. Additionally or alternatively, one or more fasteners, such as staples, may be used to secure the closure flap 310. However, the use of a second adhesive or fasteners, such as staples, may not be necessary due to the adhesive material 312.

In embodiments, the duct insulation product 300 may be rolled up prior to installation. For example, the duct insulation product 300 may be rolled up around a spool or other storage/transport device. The adhesive material 312 may be applied to the closure flap 310 prior to rolling up the duct insulation product 300. That is, the adhesive material 312 may be pre-applied adhesive. Pre-applied adhesive may refer to adhesive material 312 that does not need to be applied on-site. Pre-applied adhesive may streamline the installation process of the duct insulation product 300 as the adhesive material 312 of the present disclosure may obviate the application of staples and/or adhesive while installing the duct insulation product 300.

Figure 4:
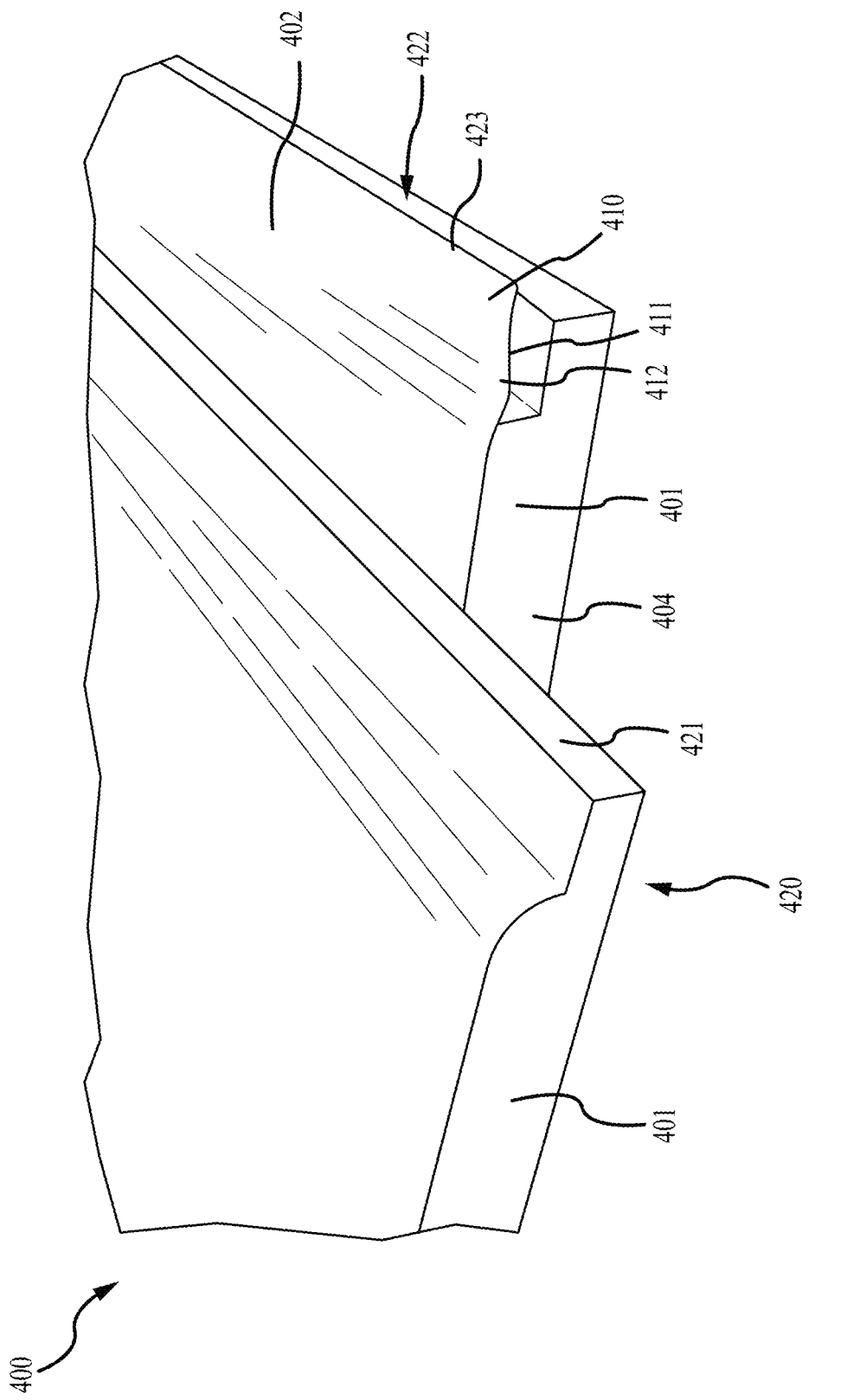
FIG. 4 illustrates an isometric view of duct insulation system with a shiplap closure flap according to embodiments of the present invention.

FIG. 4 shows an isometric view of duct insulation system 400 with a shiplap closure flap 410 according to embodiments of the present invention. While referred to as a duct insulation system, it is contemplated that the system may be positioned around various different fluid paths and/or other structures including, but not limited to, ducts, pipes, tubes, channels, passages, etc. The duct insulation system 400 may include a plurality of duct insulation products 401. The duct insulation products 401 may be the same or similar to duct insulation products 100 or 300. For example, each duct insulation product 401 may include an insulation material 404 and a moisture barrier material 402 coupled with the insulation material 404. Similar to duct insulation product 300, the moisture barrier material 402 may extend beyond a periphery of the insulation material 404 along at least one side of the insulation material 404 to form a closure flap 410. At least a portion of an inner surface 411 of the closure flap 410 may include an adhesive material 412. The insulation material 404, the moisture barrier material 402, and the adhesive material 412 may be the same or similar to the insulation material 304, the moisture barrier material 302, and the adhesive material 312, respectively, as previously described.

As previously discussed, the adhesive material 412 of the closure flap 410 of a first duct insulation product may couple with and secure a second duct insulation product. In embodiments and as illustrated in FIG. 4, a first end 420 of each duct insulation product 401 may be defined by a male shiplap profile 421. A second end 422 opposite and/or adjacent the first end 420 of each duct insulation product 401 may be defined by a female shiplap profile 421. The closure flap 410 and the adhesive material 412 may be defined on at least one inner surface 411 of the second end 422 of each duct insulation product 401. That is, the adhesive material 412 may be defined on an inner surface 411 of the female shiplap profile 421, such that the male shiplap profile 423 bonds to and is secured with the female shiplap profile 421. In embodiments, one or more ends of the duct insulation product 401 may define both a male shiplap profile 423 and a female shiplap profile 421 such that the profiles of two duct insulation products 401 correspond and complement one another to provide a more secure fitment.

Figure 5:
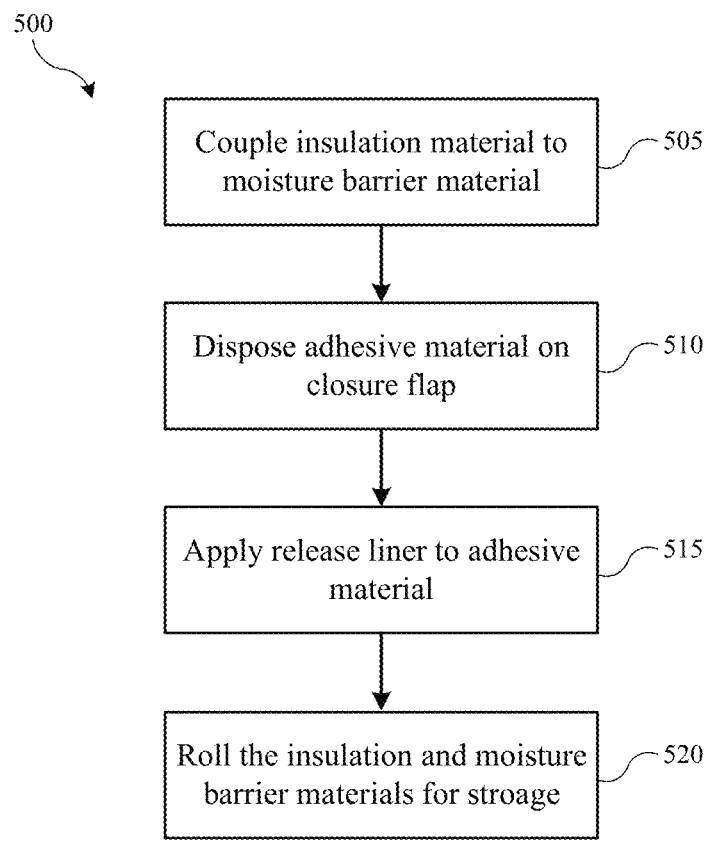
FIG. 5 schematically depicts a duct insulation manufacturing method according to embodiments of the present invention.

FIG. 5 shows a duct insulation manufacturing method according to embodiments of the present invention. At operation 505, the method may include coupling an insulation material to a moisture barrier material. The insulation material and the moisture barrier material may form an insulation product. The moisture barrier material may extend beyond a periphery of the insulation material along at least one edge to form at least one closure flap. The closure flap may result from the moisture barrier material being larger and extending beyond a periphery of the insulation material along at least one edge prior to the two materials being coupled together. Alternatively and/or additionally, the closure flap may be formed by removing a portion of the insulation material such that the moisture barrier material may extend beyond a periphery of the insulation material along at least one edge.

As previously discussed, in embodiments, the moisture barrier material may extend beyond the insulation material along two or more edges to form two or more closure flaps. For example, the moisture barrier material may extend beyond the insulation material along two edges, three edges, four edges, or more to form two closure flaps, three closure flaps, four closure flaps, or more, respectively.

At operation 510, the method 500 may include disposing an adhesive material on the at least one closure flap. The adhesive material may be similar to adhesive material 312 previously described. For example, the adhesive material may characterized by a thickness of between about 0.01 mm and about 200.0 mm. The adhesive material may be characterized by a width of between 0.01 mm and about 200.0 mm. Further, the adhesive material may be disposed along substantially an entire length of the at least one closure flap. However, it is also contemplated that the adhesive material may be disposed intermittently or discontinuously along the length of the at least one closure flap. In embodiments with two or more closure flaps, the method 500 may include disposing the adhesive material on any of number of the closure flaps, such as two or more closure flaps.

At operation 515, the method 500 may include applying a release liner to the adhesive material. The release liner may protect the adhesive material prior to application (i.e., installation of the duct product). The release liner may be the same as or similar to release liner of duct insulation products 300 or 401. The release liner may be removably adhered to the adhesive material on the closure flap to protect the adhesive material prior to installation.

In embodiments, the method 500 may include rolling the insulation material and the moisture barrier material for storage after applying release liner at operation 520. As previously discussed, the adhesive material may be applied prior to storage and/or on-site installation. The pre-applied adhesive material may increase efficiency in installing duct insulation products as the need for fastening, such as stapling, and applying an outer adhesive is obviated.

Embodiments of the present disclosure may allow for easier and quicker installation of duct insulation products. In conventional designs, the closure flap, commonly referred to as a staple flap, does not have an adhesive. Instead, the staple flap is secured by fastening, such as with staples, and then an outer seal is disposed over the top of the staples. In embodiments of the present disclosure, the closure flap includes an adhesive already disposed on the closure flap. During installation, a user may simply remove a release liner or prep the adhesive and stick the adhesive to the insulation product. Closure flaps of the present technology eliminate the need for staples and an outer seal.

The methods, systems, and devices discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

What is claimed is:

1. A duct insulation product comprising:
    an insulation material;
    a moisture barrier material coupled with the insulation material, the moisture barrier material forming an outer surface of the duct insulation product and covering an entire exterior surface of the insulation material, wherein the outer surface of the moisture barrier material comprises a foil facing or a poly facing, wherein:
        the moisture barrier material extends continuously between a first edge and an opposed second edge, and comprises at least one closure flap along the first edge, the second edge, or both the first edge and the second edge of the moisture barrier material, the closure flap extending beyond a periphery of the insulation material along at least two adjacent edges of the insulation material; and
        at least a portion of an inner surface of the closure flap comprises an adhesive material disposed along the at least two adjacent edges of the insulation material; and
    a release liner applied atop the adhesive material along the at least two adjacent edges of the insulation material.

2. The duct insulation product of claim 1, wherein:
    the duct insulation product is flexible.

3. The duct insulation product of claim 1, wherein:
    the insulation material comprises fiberglass.

4. The duct insulation product of claim 1, wherein:
    the moisture barrier material comprises a foil scrim kraft paper laminate, fiberglass reinforced faces, a poly facing, polyisocyanurate, an all service jacketing facing.

5. The duct insulation product of claim 1, wherein:
    the adhesive material is characterized by a thickness of greater than or about 0.01 mm.

6. The duct insulation product of claim 1, wherein:
    the adhesive material is characterized by a peel strength of greater than or about 60 ounces per inch.

7. The duct insulation product of claim 1, wherein:
    the adhesive material is disposed along substantially an entire length of the moisture barrier material.

8. The duct insulation product of claim 1, wherein:
    the adhesive material comprises double-sided tape.

9. The duct insulation product of claim 1, wherein:
the duct insulation product is rolled up prior to installation; and
the adhesive material is applied to the closure flap prior to rolling up the insulation material.

10. A duct insulation system comprising:
a plurality of duct insulation products, each duct insulation product comprising an insulation material and a moisture barrier material coupled with the insulation material, wherein:
the moisture barrier material of each duct insulation product covers an entire exterior surface of the insulation material of the respective duct insulation product;
the moisture barrier material extends continuously between a first edge and an opposed second edge, and beyond a periphery of the insulation material along the first edge, the second edge, or both the first edge and the second edge of the insulation material to form a closure flap that extends beyond a periphery of the insulation material along at least two adjacent edges of the insulation material;
at least a portion of an inner surface of the closure flap along both of the at least two adjacent edges of the insulation material comprises an adhesive material; and
the adhesive material of the closure flap of a first duct insulation product couples with and secures a second duct insulation product.

11. The duct insulation system of claim 10, wherein: the duct insulation system is positioned around one or more ducts.

12. The duct insulation system of claim 10, wherein:
the adhesive material is characterized by a thickness of greater than or about 0.01 mm; and
the adhesive material is characterized by a width of less than or about 8.0 inches.

13. The duct insulation system of claim 10, wherein:
the moisture barrier material comprises a length at least double a width of the moisture barrier material.

14. The duct insulation system of claim 10, wherein:
the adhesive material is disposed along substantially an entire length of the moisture barrier material.

15. The duct insulation system of claim 10, wherein:
the first edge of each duct insulation product is defined by a male shiplap profile; and
the second edge of each duct insulation product is defined by a female shiplap profile, wherein the closure flap and the adhesive material are defined on at least one inner surface of the second edge.

16. A duct insulation manufacturing method comprising:
coupling an insulation material to a moisture barrier material to form an insulation product, the moisture barrier material forming an outer surface of the duct insulation, wherein:
the insulation material comprises a plurality of planar segments that are pivotable relative to one another;
the outer surface of the moisture barrier material comprises a foil facing or a poly facing;
the moisture barrier material extends continuously between a first edge and an opposed second edge, and beyond a periphery of the insulation material along the first edge, the second edge, or both the first edge and the second edge to form at least one closure flap;
the at least one closure flap extending beyond a periphery of the insulation material along at least two adjacent edges of the insulation material; and
the moisture barrier material covers an entire exterior surface of the insulation material;
disposing an adhesive material on the at least one closure flap along the at least two adjacent edges of the insulation material; and
applying a release liner to the adhesive material along the at least two adjacent edges of the insulation material, wherein the release liner protects the adhesive material prior to application.

17. The duct insulation manufacturing method of claim 16, further comprising:
rolling the insulation material and the moisture barrier material for storage after applying release liner.

18. The duct insulation manufacturing method of claim 16, wherein:
the moisture barrier material extends beyond the insulation material along two or more edges to form two or more closure flaps; and
further comprising disposing the adhesive material on two or more closure flaps.

19. The duct insulation manufacturing method of claim 16, wherein:
the adhesive material is characterized by a thickness of between about 0.01 mm and about 200.0 mm; and
the adhesive material is characterized by a width of between about 0.5 inches and about 8.0 inches.

20. The duct insulation manufacturing method of claim 16, wherein:
the adhesive material is disposed along substantially an entire length of the at least one closure flap.

* * * * *